United States Patent [19]

Kushigian

[11] 4,209,087
[45] Jun. 24, 1980

[54] WORKPIECE FEED AND REMOVAL MECHANISM

[76] Inventor: Anthony Kushigian, P.O. Box 768, Hendersonville, N.C. 28739

[21] Appl. No.: 934,196

[22] Filed: Aug. 16, 1978

[51] Int. Cl.$^2$ .................. B23Q 5/22; B23Q 7/00; B65G 47/00
[52] U.S. Cl. .................. 198/339; 51/215 CP; 51/215 UE; 198/488; 198/774
[58] Field of Search .................. 198/339, 488, 774; 51/215 CP, 215 UE; 414/749, 750, 222

[56] References Cited

U.S. PATENT DOCUMENTS

| | | | |
|---|---|---|---|
| 3,986,617 | 10/1976 | Blomquist | 198/339 |
| 4,050,571 | 9/1977 | Kushigian | 198/774 |
| 4,122,941 | 10/1978 | Giles et al. | 198/774 |

Primary Examiner—Joseph E. Valenza
Attorney, Agent, or Firm—Barnes, Kisselle, Raisch & Choate

[57] ABSTRACT

A mechanism for moving a plurality of workpieces toward a work station of a machine tool, loading workpieces into the machine tool, and removing processed workpieces therefrom in which the mechanism for indexing, raising and lowering a walking beam is carried by a slide for extending the walking beam into and removing it from the work station of the machine tool. The processed workpieces withdrawn from the machine tool are removed from the walking beam by a pusher mechanism.

14 Claims, 15 Drawing Figures

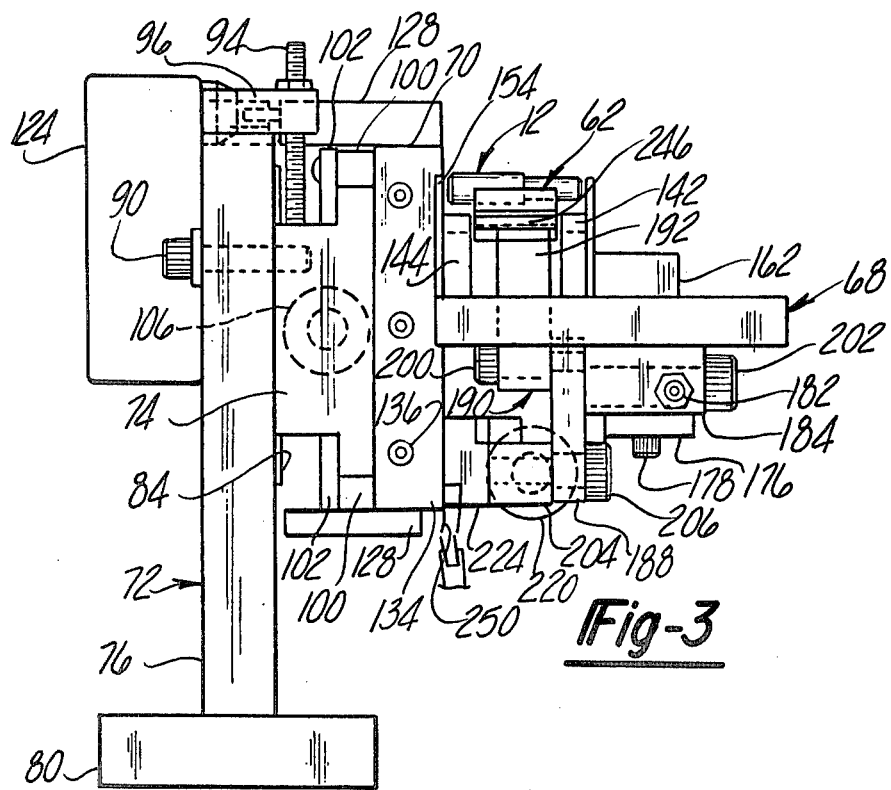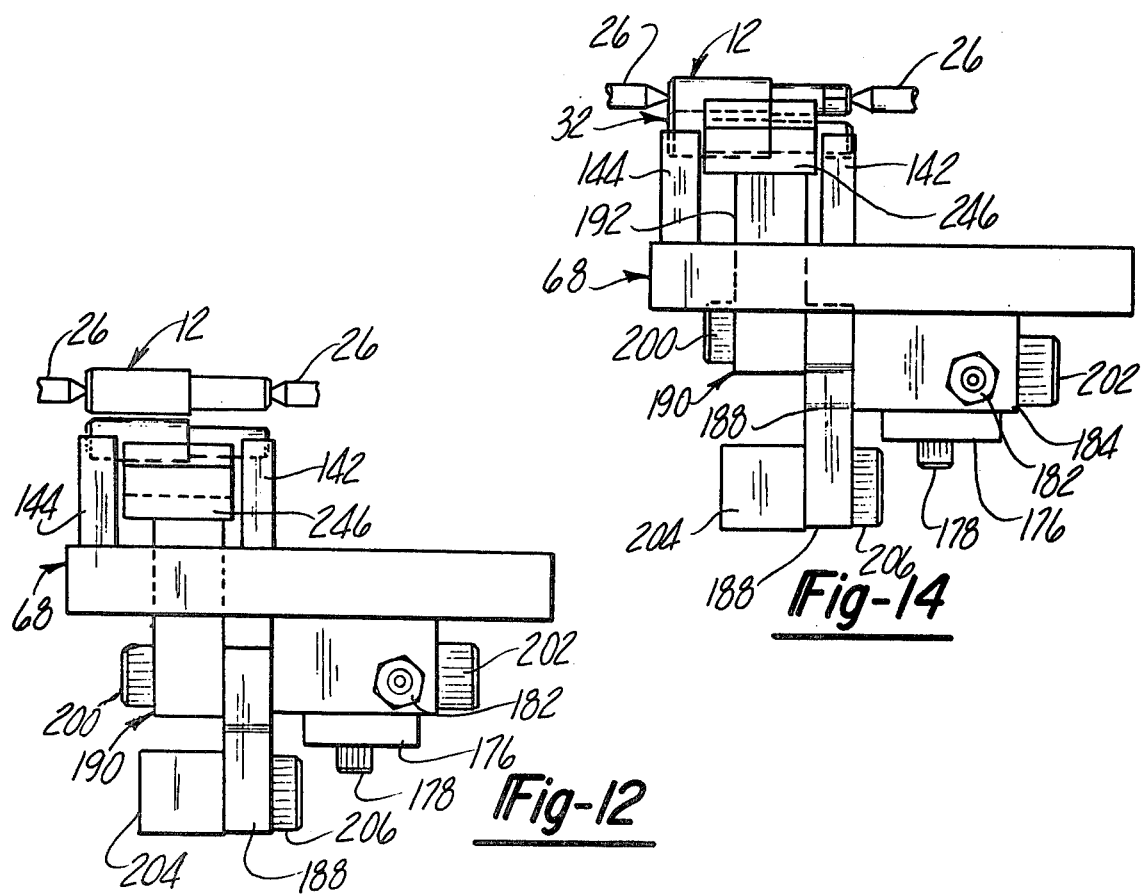

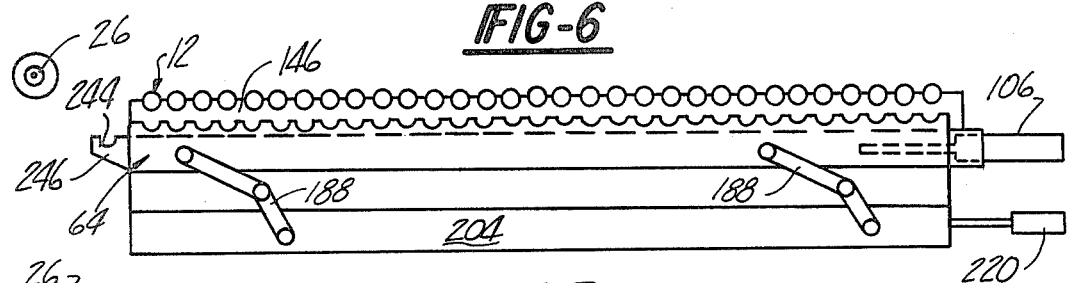
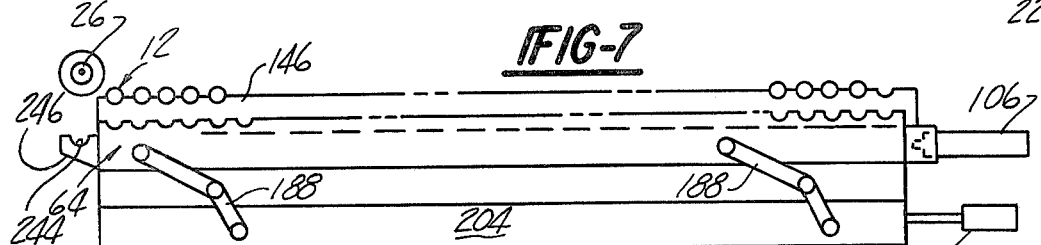
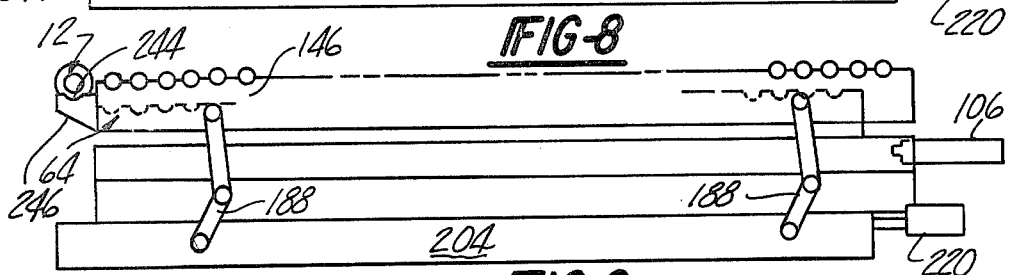
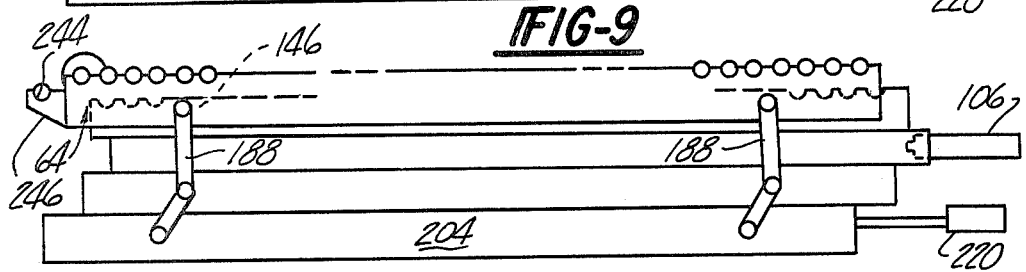
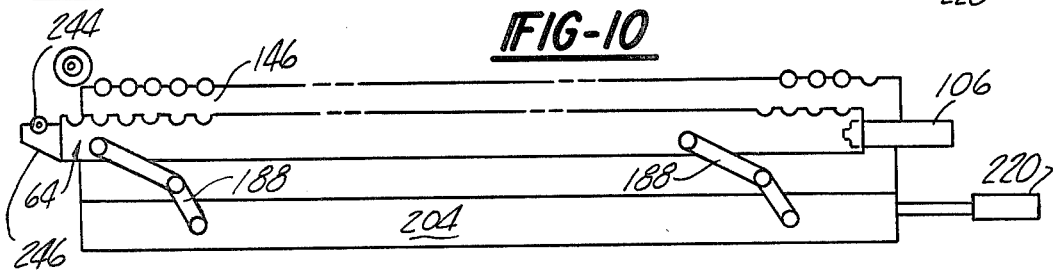
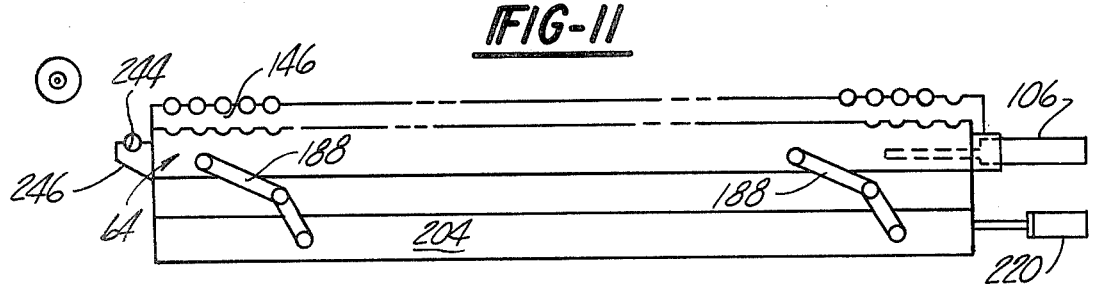

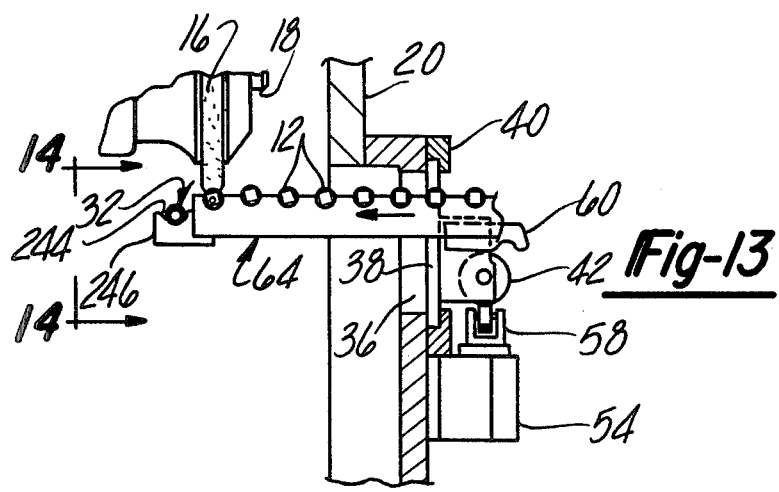
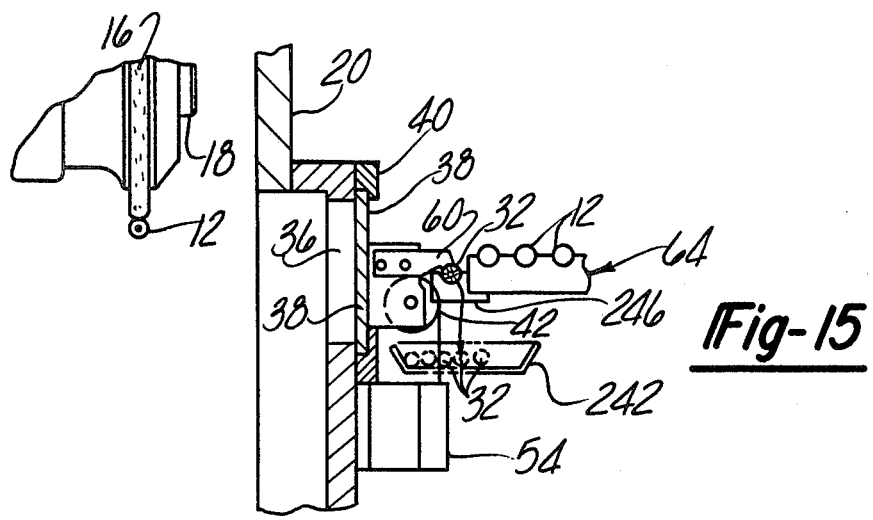

WORKPIECE FEED AND REMOVAL MECHANISM

This invention relates to mechanism for transferring workpieces into and out of a work station of a machine tool and more particularly to a walking beam type of transfer mechanism for inserting workpieces to be processed into a work station and removing processed workpieces from the work station.

Objects of this invention are to provide a transfer mechanism of simplified design and construction which is rugged, durable, reliable and will in a single cycle remove a processed workpiece from a work station, insert a workpiece to be processed into the work station, and advance a plurality of workpieces to be processed toward the work station.

These and other objects, features and advantages of this invention will be apparent from the following description, appended claims and accompanying drawings in which:

FIG. 3 is an end view of the feed mechanism of FIG. 1 with the front workpiece support cradle and guide plate in place;

Figure 1:
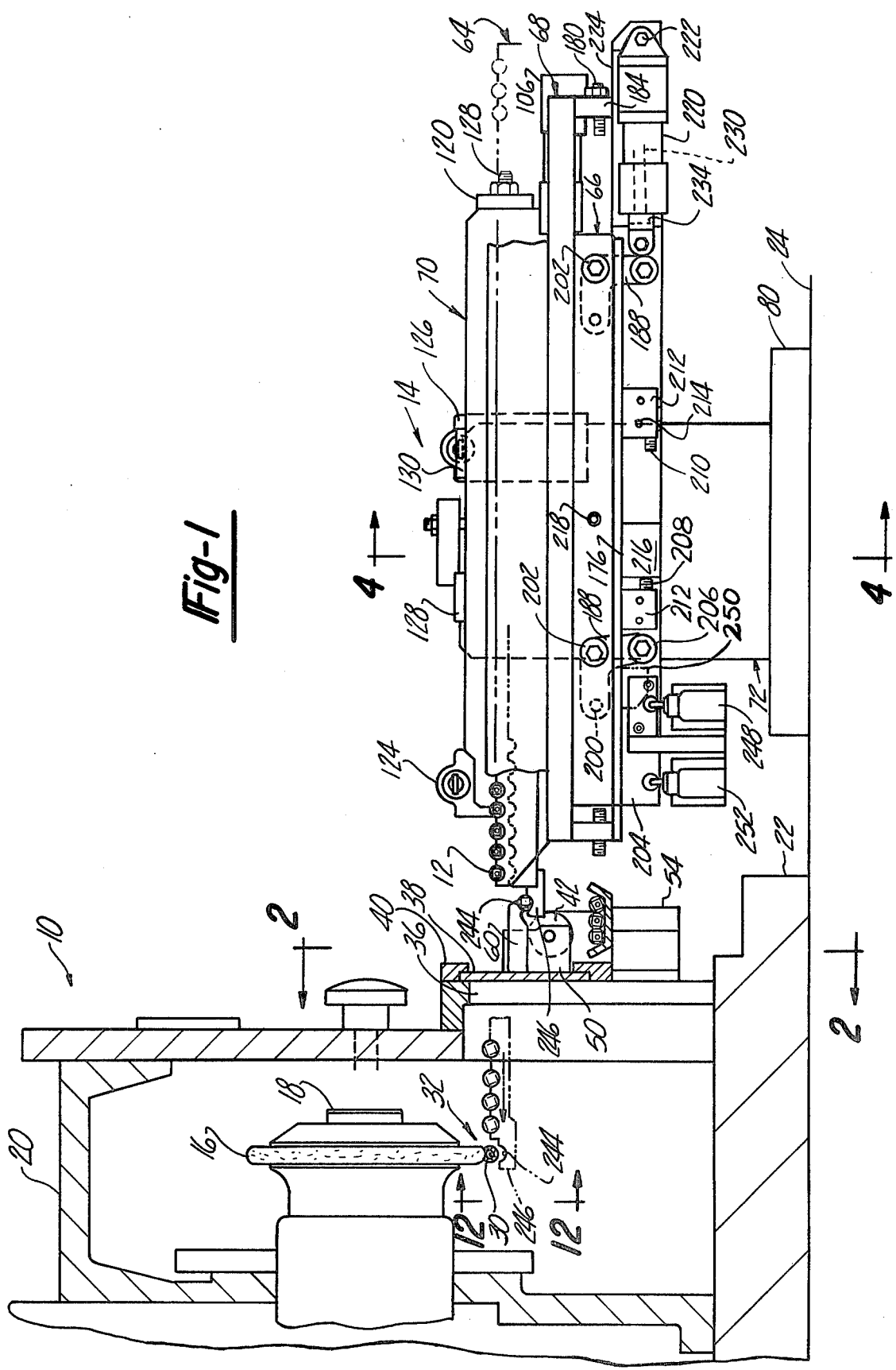
FIG. 1 is a fragmentary side view partially in section of a machine for grinding flutes for taps utilizing a workpiece feed and removal mechanism embodying this invention with the front workpiece support cradle and guide plate removed and the walking beam fully lowered and retracted.

FIGS. 6 through 11 are semi-schematic side views illustrating the position of major component parts of the feed mechanism of FIG. 1 when respectively the walking beam is lowered and both the beam and main slide are fully retracted, the main slide is fully advanced, the walking beam is raised, the walking beam is fully advanced, the walking beam is lowered, and the walking beam and main slide are both fully retracted;

FIG. 12 is a semi-schematic view, taken generally on line 12—12 of FIG. 1 illustrating the position of some of the major components of the feed mechanism in relation to the workpiece centers of the machine tool, which centers are shown in the extended position engaging a processed workpiece.

FIG. 13 is a fragmentary, sectional and semi-schematic view illustrating the position of the walking beam of the feed mechanism when positioning a workpiece between the retracted centers of the machine tool;

FIG. 14 is a semi-schematic end view on line 14—14 of FIG. 13 illustrating the position of some of major component parts of the feed mechanism in relation to the workpiece centers of the machine tool which centers are shown in engagement with a workpiece to be processed which has been positioned between the center by the feed mechanism;

FIG. 15 is a fragmentary, sectional and semi-schematic view illustrating the walking beam, in its fully lowered and retracted position with a processed workpiece being ejected from the first cradle of the walking beam.

Referring in more detail of the drawings FIG. 1 illustrates a grinding machine 10 into which workpieces 12 to be processed are fed by a feed mechanism 14 in accordance with this invention. Machine 10 has a grinding wheel 16 mounted for rotation on an arbor if carried by housing 20 mounted for generally horizontal reciprocation on a bed 22 secured to a base 24.

Figure 2:
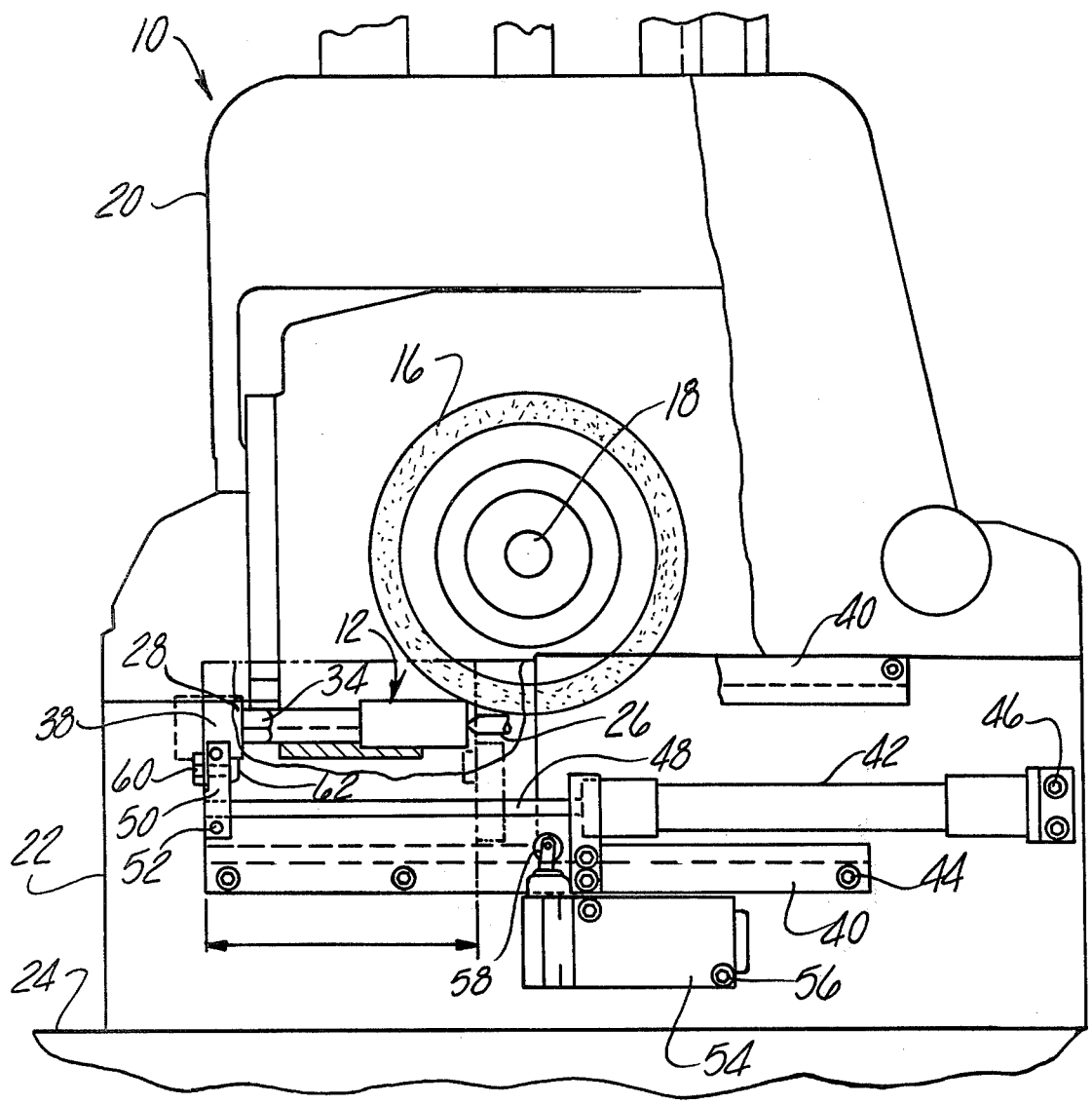
FIG. 2 is a fragmentary side view taken generally on line 2—2 of FIG. 1 of the machine and feed mechanism with a portion of the machine broken away.
Figure 4:
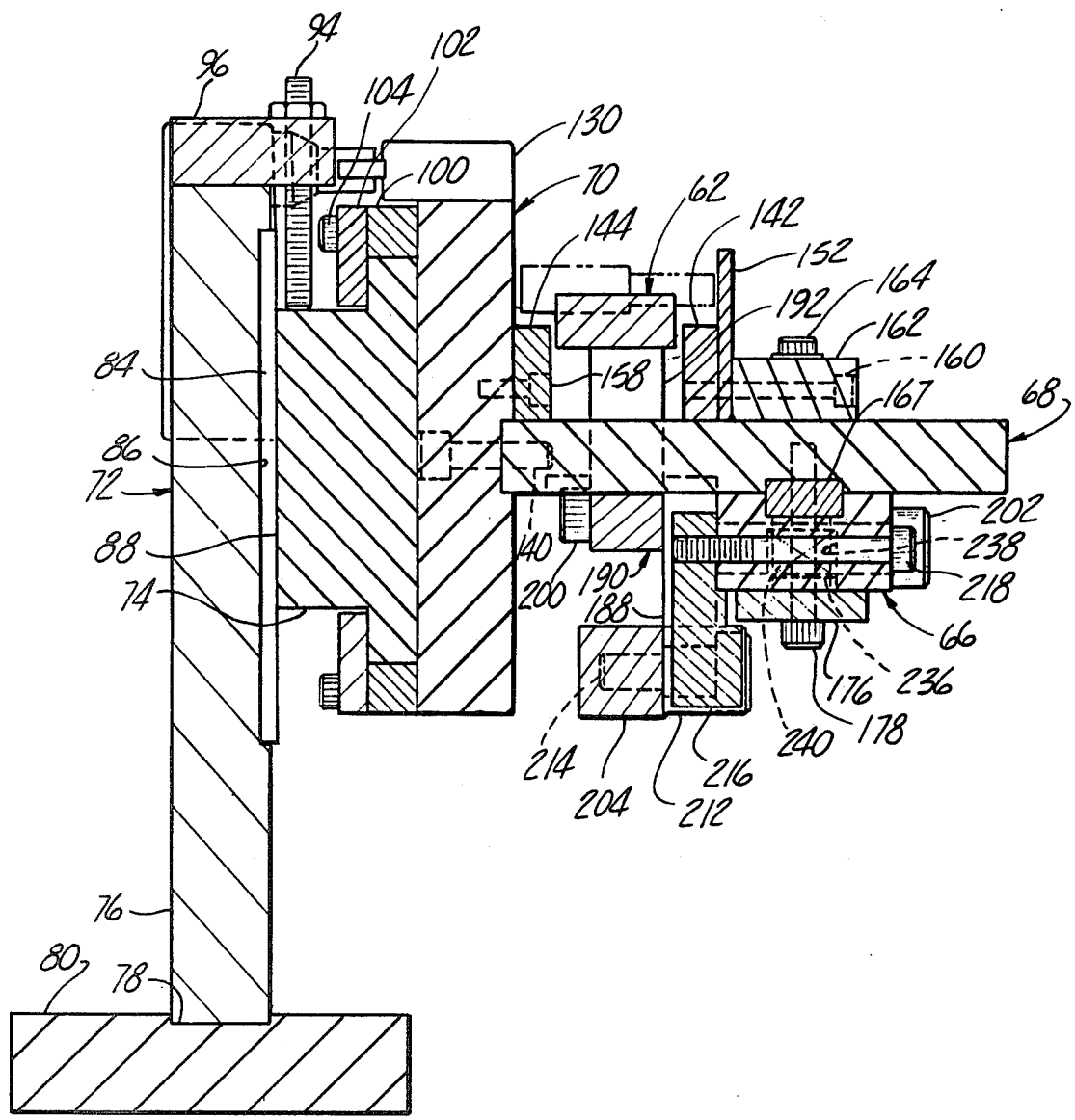
FIG. 4 is a sectional view taken generally on line 4—4 of FIG. 1 of the feed mechanism with the front workpiece support cradle and guide plate in place.
Figure 5:
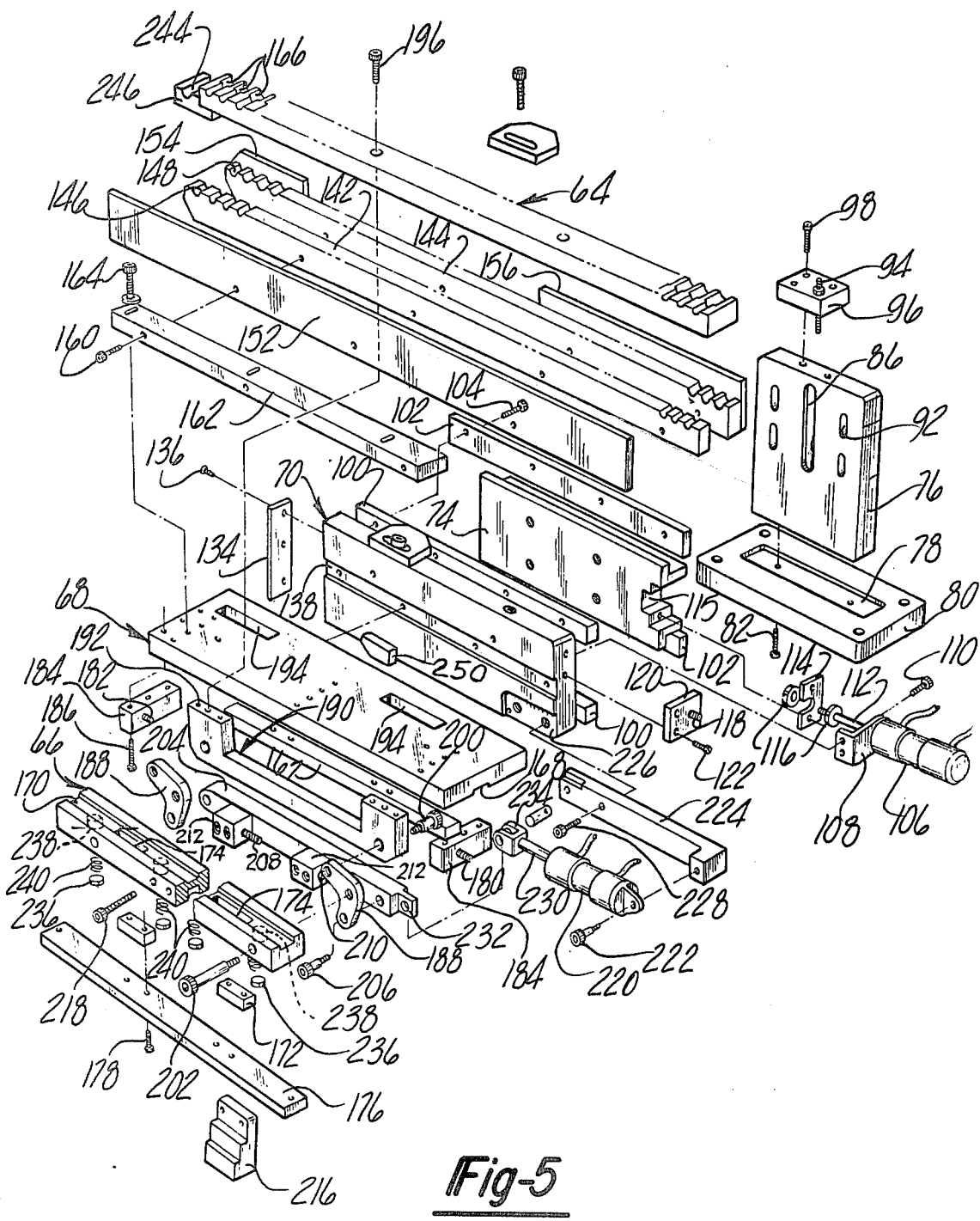
FIG. 5 is an exploded isometric view of the component parts of the feed mechanism of FIG. 1.

As shown in FIG. 2, each workpiece 12 has a pair of center holes in the opposed ends thereof and is positioned and supported in machine 10 on a pair of centers 26 which can be extended and retracted toward and away from each other. Each workpiece 12 supported by centers 26 is rotated a portion of a revolution and retained in predetermined angular position by a chuck 28 to permit grinding of axially extending flutes 30 in workpieces 12 by wheel 16 to produce a processed workpiece 32 with the flutes having a desired angular orientation with respect to a square portion 34 on the shank end of each workpiece.

Workpieces 12 are fed into machine 20 and processed workpieces 32 removed therefrom through an opening 36 in the side wall of housing 20 which opening is closed and sealed during grinding operations by a door 38 slidably carried by tracks 40 and moved to closed and opened positions by a hydraulic cylinder 42. Tracks 40 and cylinder 42 are secured to bed 22 by cap screws 44 and 46. Door 38 is connected to a piston rod 48 of cylinder 42 by a mounting block 50 threaded on the end of the rod and secured by cap screws 52 to the door. The movement of door 38 to its fully opened position, trips a limit switch 54 secured to bed 22 by cap screws 56 by engagement of its plunger 58 with block 50. A pusher finger 60 for removing a processed workpiece 32 from feed mechanism 14 is secured to block 50 by screws 62 for reciprocation with door 38 by cylinder 42.

As shown in FIGS. 1 and 3–5, mechanism 14 has a walking beam 64 for lifting and transferring workpieces 12 into and removing processed workpiece 30 from grinding machine 10. Walking beam 64, illustrated in its lowered and fully retracted position in FIG. 1, is carried by a slide 66 mounted on a supporting table 68 for reciprocating the walking beam with respect to the table. Table 68 is carried by another slide 70 mounted on a base 72 for generally longitudinal reciprocation of the table with respect to the base. Slide 70 is carried on a T-shaped way plate 74 secured to a riser plate 76, the lower end of which is received in a pocket 78 of a base plate 80 and fastened therein by cap screws 82. Way plate 74 is guided for vertical movement on riser plates 76 by a key 84 (FIGS. 3 and 4) received in a pocket 86 in the riser plate and a groove 88 in the rear face of way plate 74. Way plate 74 is secured in a desired position of vertical adjustment on riser plate 76 by a plurality of cap screws 90 extending through elongate slots 92 in the riser plate. An adjustable stop limiting the vertically upward movement of way plate 74 with respect to riser plate 76 is provided by a screw 94 received in a mounting block 96 secured to the upper end of the riser plate by cap screws 98.

Slide 70 is mounted for reciprocation on way 74 by a pair of upper and lower spacers 100 and keepers 102 secured to slide 70 by cap screws 104. Slide 70 is reciprocated on way 74 by a hydraulic cylinder 106 mounted by a bracket 108 and cap screws 110 on slide 70. The piston rod 112 of cylinder 106 is connected to way 74 by a bracket 114 fixed in a pocket 115 thereof and jam nuts 116 threaded on rod 112 and bearing on opposed faces of the bracket to permit axial adjustment of the rod in relation to way 74 and hence adjustment of the starting position of table 68 and slide 70 relative to base 72. The extent of the forward travel of slide 70 relative to way 74 is limited by an adjustable stop screw 118 received in a plate 120 secured to slide 70 by a cap screw 122 and positioned for abutment with an end of way 74. To indicate when slide 70 is in the fully extended and retracted positions, a pair of limit switches 124, and 126 (FIGS. 1 and 4) fixedly mounted on way 74 are tripped by adjustable dogs 128 and 130 respectively, which are secured by cap screws 132 to slide 70. A cover plate 134 is secured to the end of slide 70 by cap screws 136.

An edge of table 68 is recieved in a groove 138 of slide 70 and secured therein by cap screws 140 for reciprocation of the table with the slide. A plurality of workpieces 12 are carried on table 68 by front and back workpiece support cradles 142 and 144, each of which has a plurality of equally longitudinal spaced semi-circular cradle recesses 146 and 148 therein for receiving opposed ends of workpieces 12. Preferably, the radius of each recess 146 and 148 is only slightly greater than the radius of the corresponding generally cylindrical reduced shank and the enlarged head portions respectively of workpieces 12. Axial shifting of workpieces 12 in workpiece support cradles 142 and 144 is limited by a front workpiece retainer plate 152 and rear retainer plates 154 and 156 together with a vertical face of slide 70. Rear retainer plates 154 and 156 are fixed to workpiece support cradle 144 which is secured in abutment with table 68 to slide 70 by cap screws 158. Front workpiece support cradle 142 and retainer plate 152 are fastened by cap screws 160 to a mounting bar 162 secured to table 68 by cap screws 164. Walking beam 64 has a plurality of equally longitudinally spaced axially extending semi-circular step cradle recesses 166 thereon for receiving workpieces 12 therein.

Walking beam 64 is longitudinally reciprocated with respect to table 68 by slide 66 mounted on the underface of the table. Longitudinal movement of slide 66 is guided by a key 167 received in mating grooves 168 and 170 in the table and slide respectively. Slide 66 is retained on table 68 by spacer blocks 172 received in elongate clearance slots 174 in the slide and an underlying keeper bar 176 which is secured along with key 167 to table 68 by cap screws 170. Adjustable stops limiting the travel of slide 66 are provided by adjustment screws 180 and 182 received in end spacer blocks 184 interposed between keeper bar 176 and table 68 and secured thereto by cap screws 186.

Walking beam 64 is movably mounted on slide 66 by a pair of bell cranks 188 and a generally U-shaped lifter bar 190 having legs 192 projecting through clearance slots 194 in table 68 and secured to the walking beam by cap screws 196. The bell cranks 188 are pivotally connected at one end to lifter bar 190 by pivot screws 200, at their centers to slide 66 by pivot screws 202, and at their other end to link bar 204 by pivot screws 206. The extent of the generally vertical travel of walking beam 64 is limited by adjustable stop screws 208 and 210 threaded in blocks 212 secured to link bar 204 by cap screws 214 and arranged to engage opposite ends of an abutment block 216 secured to slide 66 by cap screws 218.

Walking beam 64 is both raised and lowered generally vertically and longitudinally indexed both forwardly and rearwardly of table 68 by a single hydraulic cylinder 220, the housing of which is pivotally connected by screw 222 to a mounting bracket 224 fastened in recess 226 of slide 70 by cap screws 228. The piston rod 230 of cylinder 220 is pivotally connected to a tang 232 of link bar 204 by a clevis and pin assembly 234 fixed to the free end of piston rod 230. To insure that cylinder 220 will completely raise and lower walking beam 64 before causing the beam to index longitudinally, the movement of slide 66 relative to table 68 is yieldably restrained by a plurality of friction discs 236 bearing on keeper bar 176. Friction discs 236 may be of a brake lining material and are received in blind pockets 238 of slide 66 and yieldably urged by springs 240 into engagement with keeper bar 176. As thus far described, the structure of mechanism 14 is disclosed in greater detail in U.S. Pat. No. 4,050,571 issued on Sept. 27, 1977 which is incorporated herein by reference.

In accordance with one feature of this invention, mechanism 14 is constructed and arranged to receive processed workpieces 32 released from centers 26 and remove the processed workpieces from grinding machine 10, and in cooperation with pusher finger 60 unload the processed workpieces into a container 242 as shown in FIG. 15. As shown in FIG. 1, workpieces 32 released from center 20 are received in a semi-circular catch cradle 244 in a nose block 246 fixed to the forward end of walking beam 64. Catch cradle 246 is longitudinally spaced the same distance from the first workpiece cradle 166 of walking beam 64 as the cradles 166 are spaced from each other and preferably, although not necessarily, is offset so that it is somewhat lower than the workpiece cradles 166 of the walking beam. This offset provides a slight clearance between catch cradle 244 and a processed workpiece 32 carried by centers 26 when the walking beam is fully vertically raised. With this slight clearance when centers 26 are retracted, the processed workpiece 32 drops slightly so that its axis is below that of the retracted centers 26 thereby assuring that the processed workpiece when moved by the walking beam does not become hung up on the retracted centers.

Mechanism 14 is used to transfer a plurality of workpieces 12 for making taps into machine tool 10 for grinding flutes 28 in each workpiece 12 and to remove processed workpieces 32 one at a time from the machine tool. Mechanism 14 is constructed, arranged and operated such that in each complete cycle it picks up a processed workpiece 32 released from machine 10 by retraction of centers 26, positions a workpiece 12 to be processed between centers 26 to be engaged thereby when they are extended, advances all of the other workpieces 12 to the left (as shown in FIG. 1) to a recess 146 and 148 of cradles 142 and 144 immediately adjacent the recess from which they were picked up, removes a processed workpiece 32 from the machine, and in cooperation with finger 60 deposits the removed processed workpiece 32 in the tray 242. To facilitate description of the operation of mechanism 14 in loading workpieces and unloading processed workpieces from machine tool 10, some of the component parts of mechanism 14 are shown somewhat schematically in FIG. 6 through 11 in which the relative motion of some of the parts is exaggerated including the bell cranks and in which the arcs traversed thereby are not to scale.

In use, mechanism 14 begins each cycle as shown in FIGS. 1 and 6 with slide 66 and table 68 fully retracted, walking beam 62 fully lowered and reverse indexed or retracted, and a plurality of workpieces 12 received in support cradles 142 and 144; which is achieved by extending piston rod 112 of cylinder 106 and retracting piston rod 230 of cylinder 220. Door 38 of machine 10 is closed by cylinder 42 while the machine grinds flutes 28 in a workpiece 12 to produce a processed workpiece 32 which is carried by extended centers 26 of the machine. When machine 10 completes the grinding of flutes 28 to produce a processed workpiece 32, door 38 is opened by a retraction of the piston rod of cylinder 42 by an appropriate electrohydraulic circuit (not shown).

As shown in FIG. 7, with door 38 fully opened the catch cradle 244 of mechanism 14 is extended into machine 10 to directly underlie a processed workpiece 32 by energizing cylinder 106 to retract piston rod 112 until adjustable stop screw 118 bears on the end of way 74. Cylinder 106 is energized to advance table 28 and hence catch cradle 244 by a suitable electro-hydraulic circuit (not shown) in response to a change of state of the contacts of limit switch 54 caused by its plunger 58 being engaged by block 50 upon door 38 being fully opened by cylinder 42.

As shown in FIG. 8, walking beam 64 is raised generally vertically to lift all of the workpieces 12 from support cradles 146 and 148 and position catch cradle 244 closely adjacent to workpiece 32, and then centers 26 are retracted to deposit processed workpiece 32 in catch cradle 244. Thereafter, as shown in FIGS. 9 and 13 the workpiece 12 in the cradle 106 immediately adjacent the left hand end of walking beam 64 (hereinafter "first" cradle 166) is positioned between the retracted centers 26 and the remaining workpieces 12 are advanced with respect to workpiece cradles 142 and 144 by forward indexing or advancing walking beam 64 a distance equal to the spacing between the centers of immediately adjacent recesses 146 and 148 of the workpiece cradles.

Centers 26 may be retracted to drop the processed workpiece 32 into catch cradle 244 at any time after the walking beam has been extended into machine 10 by fully extending table 28 and before forward indexing of the walking beam. Preferably, the centers 26 are released to drop the workpiece 32 while walking beam 64 is being raised to its fully extended position. The raising of walking beam 64 and the retraction of workpiece centers 26 is initiated by a change of state of the contacts of limit switch 248 which is tripped by adjustable dog 250 when slide 70 is fully advanced by cylinder 106, which through an appropriate electro-hydraulic circuit (not shown) energizes cylinder 220 and cylinders (not shown) constructed and arranged to retract workpiece centers 26.

Walking beam 64 is raised to its extended position and then forward indexed by the energization of cylinder 220 to extend its piston rod 230 which shifts link 204 to the left thereby rotating bell crank 188 clockwise (as viewed in FIGS, 1 and 6–11) to raise lifter 190 and hence walking beam 64. Walking beam 64 picks up all the workpieces 12 from cradles 142 and 144 and lifts the workpieces above the cradles so that the workpieces can be indexed longitudinally. Walking beam 22 is in a fully raised position as shown in FIG. 8 when link 204 has been shifted by cylinder 220 to the left sufficiently for stop screw 210 to engage block 216. The height to which walking beam 64 can be raised is easily adjusted for different parts by the setting of screw 210.

During the movement of link 204 to raise walking beam 64, friction discs 236 prevent slide 66 from moving relative to table 68 until beam 64 reaches its fully raised position with screw 210 abutting block 216, and then further extension of rod 230 by the cylinder 200 applies sufficient force directly to slide 66 via the screw and block to overcome the resistance provided by the friction discs and move both slide 66 and walking beam 64 in unison to the left. The walking beam and slide 66 are advanced in unison until the slide abuts adjustable stop screw 182 (FIG. 1).

As shown in FIG. 14, centers 26 are extended to engage and retain in machine 10 for processing the workpiece 12 in the first cradle 166 at the extreme left end of walking beam 64. Extension of centers 26 is initiated by the change of state of the contacts of a limit switch 252 which is tripped by dog 250 on slide 70 when the slide becomes fully advanced, which, through an appropriate electro-hydraulic circuit (not shown) energizes the cylinders (not shown) constructed and arranged to advance workpiece centers 26.

As shown in FIG. 10, walking beam 64 is fully lowered to disengage the walking beam from workpiece 12 retained by centers 26 and to deposit the remaining workpieces in recesses 146 and 148 of cradle supports 142 and 144 such that the workpieces are advanced to the left a distance equal to the spacing between immediately adjacent recesses compared to the location in which the workpieces were lifted from the workpiece cradle by the walking beam. Walking beam 64 is lowered by energizing cylinder 220 to move link 204 to the right to pivot bell cranks 188 counter-clockwise until adjustable stop 208 abuts block 216. As walking beam 64 is lowered, friction discs 236 restrain slide 66 from moving to the right until adjustable stop screw 208 engages block 216, whereupon continued actuation of cylinder 220 moves slide 66 to the right until it engages adjustable stop screw 180 (FIG. 1) thereby incrementally reverse indexing beam 64 to the position shown in FIG. 10. The lowering and reverse indexing of walking beam 64 is also initiated by the change of state of the contacts of limit switch 252 through a control circuit (not shown) providing an appropriate time delay to permit centers 26 to be extended to engage a workpiece 12 before actuating an electro-hydraulic circuit (not shown) which energizes cylinder 220 to move link 204 to the right.

After walking beam 64 is lowered, table 68 is retracted as shown in FIGS. 11 and 15 by energizing cylinder 106 to extend its piston rod 112 to thereby move table 68 and slide 70 to their fully retracted position. The energization of cylinder 106 to retract table 68 and slide 70 is also initiated by limit switch 252 through a control circuit (not shown) providing a short time delay permitting the walking beam to be fully reverse indexed before actuating an electro-hydraulic circuit (not shown) energizing cylinder 106.

When all of the components of mechanism 14 are returned to their starting position, door 38 is closed and processed workpiece 32 is ejected from catch cradle 244 of nose block 246 as shown in FIG. 15 by hydraulic cylinder 42 which closes door 38 and sweeps finger 60 generally axially through the catch cradle to displace the processed workpiece from the catch cradle and deposit it in container 242. The closing of door 38 and movement of finger 60 is initiated by a change of state of the contacts of limit switch 126 which is tripped by dog 130 when table 68 and slide 70 are fully retracted, which through an appropriate electro-hydraulic circuit (not shown) energizes cylinder 42. After processed workpiece 32 is displaced by finger 60 from catch cradle 244, mechanism 14 is ready to begin another cycle.

During initial setup of feed mechanism 14, workpiece cradles 166 of the walking beam are aligned with recesses 146 and 148 of the workpiece supports 142 and 144 for picking up and depositing workpieces in the recesses by adjusting stop screws 180 and 182 respectively. Then with table 68 extended and walking beam 64 retracted and raised, screw 210 is adjusted to move the walking beam generally vertically and stop screw 118 is adjusted to move the walking beam and table 68 in unison generally longitudinally such that the workpiece 12 received in the carrier 166 at the extreme left hand end of the walking beam is positioned so that its axis is aligned with the centers 26 of machine tool 20. Then with walking beam 64 lowered, stop screw 208 is adjusted so that the walking beam is lowered sufficiently to both pass under the workpiece retained by centers 26 and to permit a processed workpiece 32 carried by the catch cradle 244 to pass under the workpiece carried by the centers without striking it.

As set forth in greater detail in the aforementioned U.S. Pat. No. 4,050,571 transfer mechanism 14 can be readily adjusted to handle different diameter workpieces requiring different length indexing strokes of the walking beam. This may be accomplished by replacing the walking beam and workpiece supports and readjusting the various stop screws. Thus, transfer mechanism 14 may be readily and economically adapted to handle a wide range of workpieces requiring different lengths of index travel since the walking beam and workpiece supports are relatively inexpensive component parts of the mechanism.

This feed mechanism has been described hereinabove for purposes of illustration and is not intended to indicate the limits of the present invention, the scope of which is defined by the following claims.

I claim:

1. A mechanism for loading workpieces into a machine tool and removing processed workpieces from the machine tool comprising: a base; a first slide carried by said base for reciprocal movement relative to said base on a generally horizontal extending first path between spaced apart extended and retracted positions of said slide; a plurality of workpiece supports equally spaced apart generally in one direction along said first path and carried by said first slide for movement therewith relative to said base; a walking beam having at least one processed workpiece cradle adjacent one end thereof and a plurality of workpiece cradles with all of said cradles being equally spaced apart generally in one direction along said first path; said walking beam being carried by said first slide for movement with respect thereto along said first path between spaced apart forward indexed rearward indexed positions of said walking beam, and for movement generally transverse to said first path to spaced apart raised and lowered positions of said walking beam; index means carried by said first slide and operably connected with said walking beam for moving said walking beam to said forward indexed position and said reverse indexed position; lift means carried by said first slide and operably connected with said walking beam for moving said walking beam generally transverse to said path to said raised position to thereby disengage workpieces from said workpiece supports and to said lowered position to deposit at least some of the workpieces carried by said walking beam on said workpiece supports; said processed workpiece cradle being constructed and arranged to lie beyond all of the workpiece supports containing a workpiece when said walking beam is in its reverse indexed position; means for operating said index means; means for operating said lift means; actuator means operably connected with said first slide for moving said first slide to said extended and retracted positions of said first slide; and said index means, lift means and actuator means constructed and arranged such that with said slide in its said retracted position and said walking beam in its said reverse indexed and lowered positions, said actuator means causes said first slide to move to its said extended positions so that said processed workpiece cradle on said walking beam is located directly below a processed workpiece releasably carried by a workpiece holder in a work station of the machine tool too; with said first slide in its said extended position, said lift means causes said walking beam to move to its said position while disengaging workpieces from said workpiece support and receiving such workpieces cradles of said walking beam; with said first slide extended, said walking beam raised, and a processed workpiece released from such work station of the machine tool and received in said processed workpiece cradle of said walking beam, said index means causing said walking beam to move to its said forward indexed position to locate in such work station of the machine tool a workpiece carried by said walking beam to be engaged and retained by such workpiece holder; with said first slide in its said extended position, said walking beam in its said forward indexed position, and such workpiece located by said walking beam in such work station engaged and retained by such workpiece holder, said lift means causes said walking beam to be lowered sufficiently to disengage said walking beam from such workpiece retained by such workpiece holder and to provide sufficient clearance for said walking beam and such processed workpiece received in said processed workpiece cradle to pass by such workpiece engaged by such workpiece holder without engaging such workpieces, and to deposit at least some of the workpieces carried by said walking beam onto said workpiece supports in an advanced position relative to the position from which said walking beam previously disengaged such workpieces from said workpiece supports; and with said first slide in its said forward indexed position and said walking beam in its said lowered position, said indexed means moves said walking beam to its said reverse indexed position and said actuator means moves said first slide to its said retracted position so that both said walking beam and such processed workpiece carried by such walking beam are removed from such work station of the machine tool and said walking beam is returned to its lowered and reverse indexed positions.

2. The mechanism of claim 1 wherein said means for operating said index means and said means for operating said lift means comprise a single actuator operably connected to both said lift means and said index means for causing said walking beam to move between its said raised and lowered positions and its said forward and reverse indexed positions.

3. The mechanism of claim 1 wherein said processed workpiece cradle is offset transversely to said first path from said plurality of workpiece cradles such that it is lower than said plurality of workpiece cradles.

4. The mechanism of claim 1 wherein the total extent of the transverse movement of a workpiece by said walking beam when moved to its said raised position by said lift means is not greater than about the maximum transverse dimension of such workpiece as oriented and received in one of said plurality of cradles of said walking beam.

5. The mechanism of claim 1 wherein said index means comprises a second slide carried by said first slide for reciprocable movement relative to said first slide on a path generally parallel with said first path and said lift means comprising at least two bell cranks spaced from each other and each pivotally carried by said second slide.

6. The mechanism of claim 5 which also commprises a link pivotally connected to one arm of at least one of said bell cranks with the other arm of each of said bell cranks being pivotally connected to said walking beam, such that movement of said link both pivots said bell cranks to move said walking beam to its said raised and lowered positions and shifts said second slide with respect to said first slide to move said walking beam to its said forward indexed and reverse indexed positions.

7. The mechanism of claim 1 which also comprises sensing means operatively associated with said first slide for generating a signal when said first slide reaches its said extended position with said signal initiating release of a processed workpiece by such workpiece holder of the machine tool prior to said index means initiating movement of said walking beam.

8. The mechanism of claim 7 wherein said sensing means comprises an electric switch having a pair of contacts the state of which is changed when said first slide is moved to its said extended position by said actuator means.

9. The mechanism of claim 1 which also comprises workpiece removal means constructed and arranged to remove processed workpieces from said processed workpiece cradle of said walking beam when said first slide is in its said retracted position and said walking beam is in its said lowered position.

10. The mechanism of claim 9 wherein said workpiece removal means comprises a pusher constructed and arranged to move generally longitudinally of said processed workpiece cradle to displace therefrom a processed workpiece received therein.

11. The mechanism of claim 10 wherein said workpiece removal means comprises a ram operably connected with said pusher and constructed and arranged such that when said walking beam in its said lowered and reverse indexed positions and said first slide is in its said retracted position said ram moves said pusher generally longitudinally of said processed workpiece cradle to displace therefrom a processed workpiece received therein.

12. The mechanism of claim 9 which also comprises sensing means operatively associated with said first slide for generating a signal when said first slide reaches its said retracted position with said signal initiating operation of said workpiece removal means to remove a processed workpiece from said processed workpiece cradle of said walking beam prior to said actuating means beginning to move said first slide toward its said extended position.

13. The mechanism of claim 12 wherein said sensing means comprises an electric switch having a pair of contacts the state of which is changed in response to movement of said first slide to its said retracted position by said actuator means.

14. The mechanism of claim 12 which also comprises sensing means operatively associated with said index means for generating a signal after said first slide reaches its said extended position with said signal initiating release of a processed workpiece by such workpiece holder of the machine tool prior to said index means initiating movement of said walking beam to its said forward indexed position.

* * * * *

UNITED STATES PATENT AND TRADEMARK OFFICE
CERTIFICATE OF CORRECTION

PATENT NO. : 4,209,087
DATED : June 24, 1980
INVENTOR(S) : Anthony Kushigian

It is certified that error appears in the above-identified patent and that said Letters Patent are hereby corrected as shown below:

```
In column 2, line 5, delete "if" and insert -- 18 --.
In column 5, line 53, delete "crank" and insert -- cranks--.
In column 5, line 54, after "FIGS", delete "," and insert
   -- . --.
In column 8, line 14, delete "too;" and insert -- tool --.
In column 8, line 16, after "said", please insert --
   raised --.
In column 8, line 18, after "workpieces, insert -- in said
   workpiece --.
In column 8, line 23, delete "causing" and insert -- causes --
In column 8, line 45, delete "indexed" and insert
   -- index --.
```

Signed and Sealed this

Twenty-sixth Day of May 1981

[SEAL]

Attest:

RENE D. TEGTMEYER

Attesting Officer     Acting Commissioner of Patents and Trademarks